Dec. 2, 1941.   C. T. TRENT   2,264,921
FUEL HEATER FOR INTERNAL COMBUSTION ENGINES
Filed June 27, 1940   2 Sheets—Sheet 1
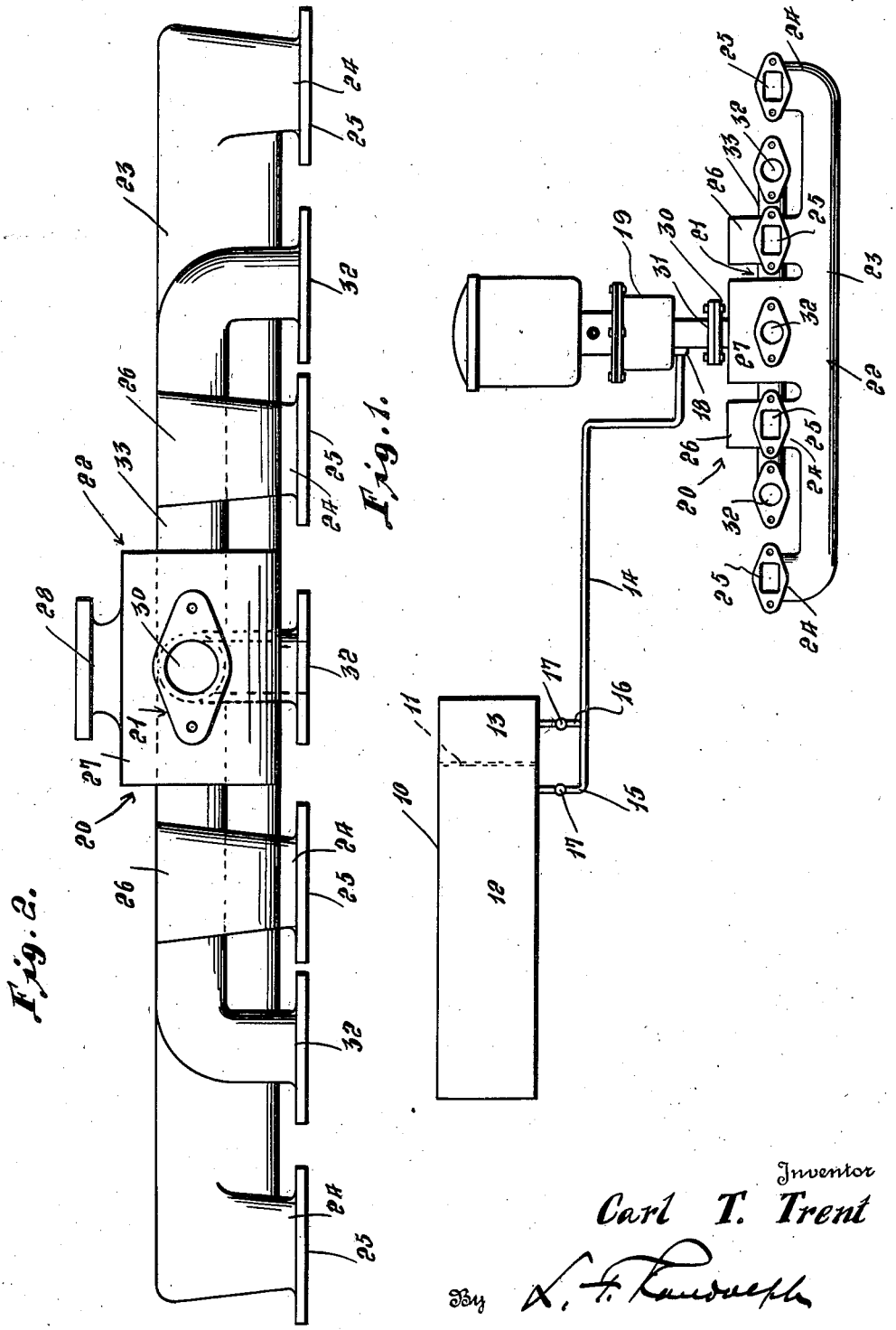
Inventor
Carl T. Trent
By [signature]
Attorney Dec. 2, 1941.  C. T. TRENT  2,264,921
FUEL HEATER FOR INTERNAL COMBUSTION ENGINES
Filed June 27, 1940   2 Sheets-Sheet 2
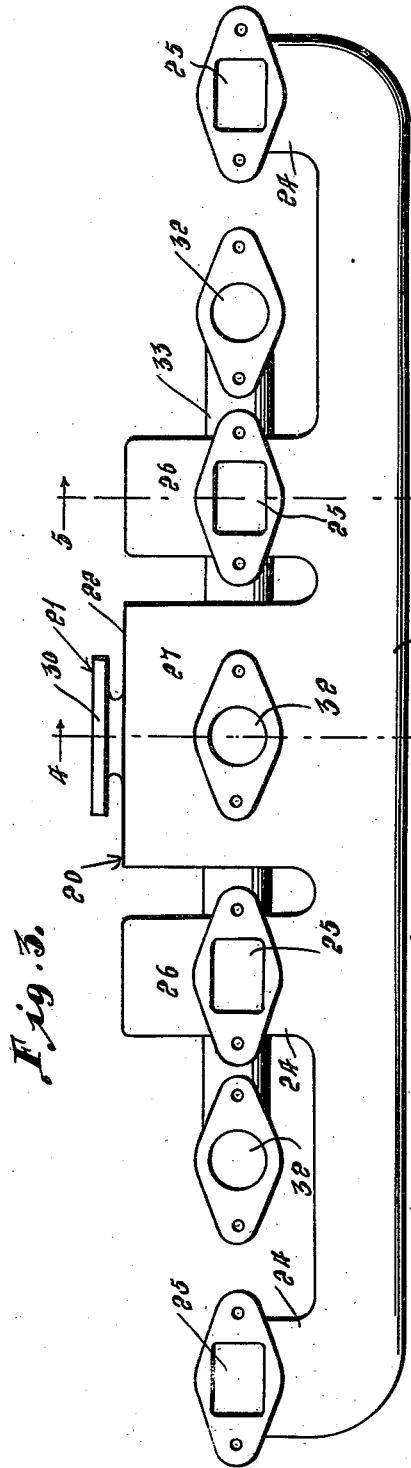
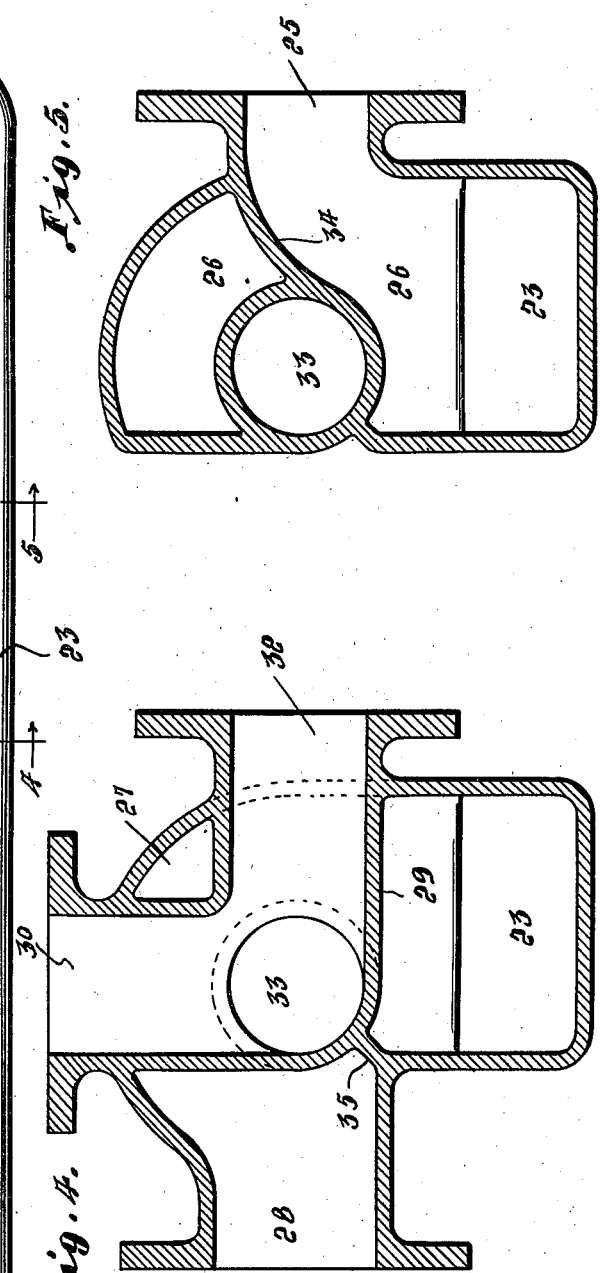
Inventor
Carl T. Trent
By
Attorney Patented Dec. 2, 1941

2,264,921

UNITED STATES PATENT OFFICE 2,264,921

FUEL HEATER FOR INTERNAL COMBUSTION ENGINES

Carl T. Trent, Jeffersonville, Ky.

Application June 27, 1940, Serial No. 342,778

1 Claim. (Cl. 123—122)

This invention relates to a device adapted to be used on internal combustion engines and especially for use on stationary engines, as for example, engines used for driving saws, generating electricity, heavy trucks and the like.

More particularly, it is an aim of the invention to provide an attachment for stationary internal combustion engines having means whereby the engine may be started and initially driven on a light hydro-carbon, such as gasoline, and after the engine has been in operation a sufficient time to become heated to a normal operating temperature, to provide means whereby a heavier hydrocarbon, such as kerosene or fuel oil, may be substituted for the gasoline to economize on the fuel cost of operating the engine.

Still another aim of the invention is to provide an improved intake exhaust manifold, constructed as a single unit and having enlarged chambers, forming a part of the exhaust manifold system and through which portions of the intake manifold system extends for heating the fuel, after it has been mixed with air, and before it is admitted to the engine cylinders.

Other objects and advantages of the invention will hereinafter become more fully apparent from the following description of the drawings, which illustrate a preferred embodiment thereof, and wherein:

Figure 1 is a side elevational view showing the attachment connected with a conventional down draft carburetor, Figure 2 is an enlarged top plan view of the integral intake exhaust manifold.

Figure 3 is a side elevational view of the same, looking toward the inner side thereof, and Figures 4 and 5 are transverse vertical sectional views, on enlarged scales, taken substantially along the planes of the lines 4—4 and 5—5, respectively, of Figure 3.

Referring more particularly to the drawings, wherein like reference characters designate like or corresponding parts throughout the different views, 10 designates generally a fuel tank having a partition 11 adjacent one end thereof dividing the tank into the separate compartments 12 and 13. The larger compartment 12 is adapted to contain a heavy hydro-carbon, such as kerosene or fuel oil and the smaller compartment 13 is adapted to contain a lighter hydro-carbon, such as gasoline. A pipe line 14 is provided with branches or laterals 15 and 16 at one end thereof which communicate with and which lead from the compartments 12 and 13, respectively. The branches 15 and 16 are provided with a control valve 17, of any suitable type, for selectively varying the flow of the fuels from the compartments 12 and 13 to the pipe line 14 or for selectively shutting off the flow of the fuel from either of the compartments 12 and 13 to the pipe line 14. The opposite end of the pipe line 14 connects with the fuel inlet 18 of a conventional carburetor 19, which, in the embodiment of the invention as illustrated, is of the down draft type.

The numeral 20, designates generally an integrally cast intake and exhaust manifold including an intake manifold, designated generally 21, and an exhaust manifold, designated generally 22.

The exhaust manifold 22 includes an elongated portion or pipe 23 having the upset end portions 24 which terminate in the laterally projecting intake ports 25. Between the upset extensions 24, the portion 23 is provided with the upset enlargements 26 forming chambers which are provided with intake ports 25 disposed in substantially the same horizontal and vertical planes as the ports 25 of the extensions 24. The ports 25 are adapted to be connected in a conventional manner to the outlet exhaust ports of an internal combustion engine, not shown. Between the chambers 26 the exhaust manifold is provided with an enlarged chamber 27 which communicates with the intermediate portion of the pipe 23 which is substantially larger than the chambers 26. As best seen in Figures 2 and 4, the chamber 27 is provided with an outlet 28 which extends therefrom in the opposite direction to the intake ports 25.

The intake manifold 21, as best seen in Figure 4, includes a right angular or L-shaped portion 29 which is disposed in the chamber 27 and which is provided with an end projecting outwardly from the top thereof forming an intake port 30 which is adapted to be secured to an outlet end 31 of the carburetor 19. The opposite end of the member 19 projects outwardly through the front wall of the chamber 27 to form an outlet port 32 which is disposed between the intermediate inlet ports 25 and in substantially the same vertical and horizontal planes. The intake manifold 21 also includes a main pipe 33 which is disposed above and substantially parallel to the portion 23 and the intermediate portion of which is formed integral with the intermediate portion of the member 29. The main pipe 23 has its ends projecting through the chambers 26 so that portions thereof are disposed in each of the chambers 26 and in the chamber 27. The pipe 23, at its ends, is provided with forwardly projecting outlet ports 32 which aline with the aforementioned port 32 and ports 25. The ports 32 are adapted to be connected in a conventional manner to the fuel intake ports of the internal combustion on which the intake exhaust manifold 20 is mounted. The intake exhaust manifold 20 may include cast portions 34, as seen in Figure 5, for directing the heated products of combustion downwardly toward the pipe 23 but which are narrower than the width of the chambers 26 so that the products of combustion may pass from the lower portion of the chamber 26 to the upper portion thereof. Likewise, the diameter of the member 29 and the main pipe 33 is substantially less than the width, length and depth of the chamber 27 so that the products of combustion when passing into said chamber from the pipe 23 may circulate in and around the portions of the intake manifold 21, which are disposed therewithin, in passing to the exhaust manifold outlet 28. In order to insure that the products of combustion will pass more completely around the portions of the intake manifold 21, disposed in the chamber 27, a casting portion 35 is provided which forms a baffle, for directing the products of combustion, entering the chamber 27, away from its outlet 28.

From the foregoing it will be obvious that the valve 17 of the branch 15 would be closed and the valve 17 of the branch 16 opened for starting the engine, not shown, to which the invention is attached, in the conventional manner, after which the engine may be run on the gasoline from the compartment 13 until it is heated to efficient operating temperature. The valve 17 of the branch pipe 15 can then be opened and the valve 17 of the branch pipe 16 thereafter closed to shut off the supply of gasoline to the carburetor 19 and to supply in lieu thereof a heavier hydrocarbon, which may be kerosene or fuel oil, for example, to the carburetor. In order to insure efficient operation of the engine on a heavy hydro-carbon, such as fuel oil or kerosene, it is necessary to provide means for vaporizing the mixture of the hydro-carbon and air before said mixture reaches the engine. In order to accomplish this result, the dual manifold 20 is provided, having the chambers 26 and 27 for heating the mixture before it reaches the engine. All of the mixture passes through the chamber 27 where it is first heated and the mixture which is discharged from the outer ports 32 is further heated in passing through the chambers 26, so that this portion of the mixture, which travels further to reach the engine, will be heated to substantially the same temperature as the remainder of the mixture which passes to the engine from the intermediate ports 32, to thereby provide uniformity, in so far as possible, in the power produced by explosions of the different cylinders of the engine.

Various modifications and changes are contemplated and may obviously be resorted to as only a preferred embodiment of the invention has been disclosed.

I claim as my invention:

An integral intake and exhaust manifold having an exhaust manifold portion provided with a plurality of intake ports and having a plurality of enlarged chambers, certain of said ports opening directly into said chambers, and an intake manifold portion having spaced passage portions extending through said chambers, said chambers being arranged so that a portion of the mixture passing through the intake manifold portion will pass through a plurality of said chambers.

CARL T. TRENT.